United States Patent [19]
Rice et al.

[11] 3,988,704
[45] Oct. 26, 1976

[54] BROADBAND ELECTROOPTICAL MODULATOR

[75] Inventors: Robert R. Rice, St. Louis County; Victor H. Nettle, St. Louis; Louis B. Allen; Samuel I. Green, both of St. Louis County, all of Mo.

[73] Assignee: McDonnell Douglas Corporation, Long Beach, Calif.

[22] Filed: Apr. 26, 1974

[21] Appl. No.: 464,497

[52] U.S. Cl. .......................... 332/7.51; 331/94.5 M; 350/150
[51] Int. Cl.² .......................................... H01S 3/10
[58] Field of Search ............. 332/7.51; 331/94.5 M; 250/199, 206; 350/150, 159

[56]  References Cited
  UNITED STATES PATENTS

| | | | |
|---|---|---|---|
| 3,532,891 | 10/1970 | Simmons et al | 350/159 |
| 3,675,022 | 7/1972 | Nelson et al | 250/199 |
| 3,691,484 | 9/1972 | Dore | 332/7.51 |
| 3,696,404 | 10/1972 | Brainerd | 332/7.51 |
| 3,849,732 | 11/1974 | Pezot | 350/150 |

OTHER PUBLICATIONS

Brand, "Optical Modulator System," 10/72, Rept. No.: NASA–cr–130195.

Chenaveth et al., "High Data Rate Modulator," 9/72, Rept. No. AD–908–291/8st.

Biazzo, "Fabrication of a Lithium Tantalate . . .," 5/71, pp. 1016–1020, Applied Optics, vol. 10, No. 5.

*Primary Examiner*—Nelson Moskowitz
*Attorney, Agent, or Firm*—G. W. Finch; W. J. Jason; D. L. Royer

[57] ABSTRACT

Broadband electrooptical modulator means for use in optical and electrooptical communication systems and the like, the modulator means including modulator driver and driver amplifier means, broadband matching network means, temperature control means, and means to automatically compensate for variations including electronic variations in the output. The subject modulator means employ optically coupled crystal elements which have their optical Z-axes oriented perpendicularly to each other to cancel natural birefringence and to reduce temperature sensitivity including the temperature sensitivity of the extinction ratio of the crystals.

22 Claims, 4 Drawing Figures

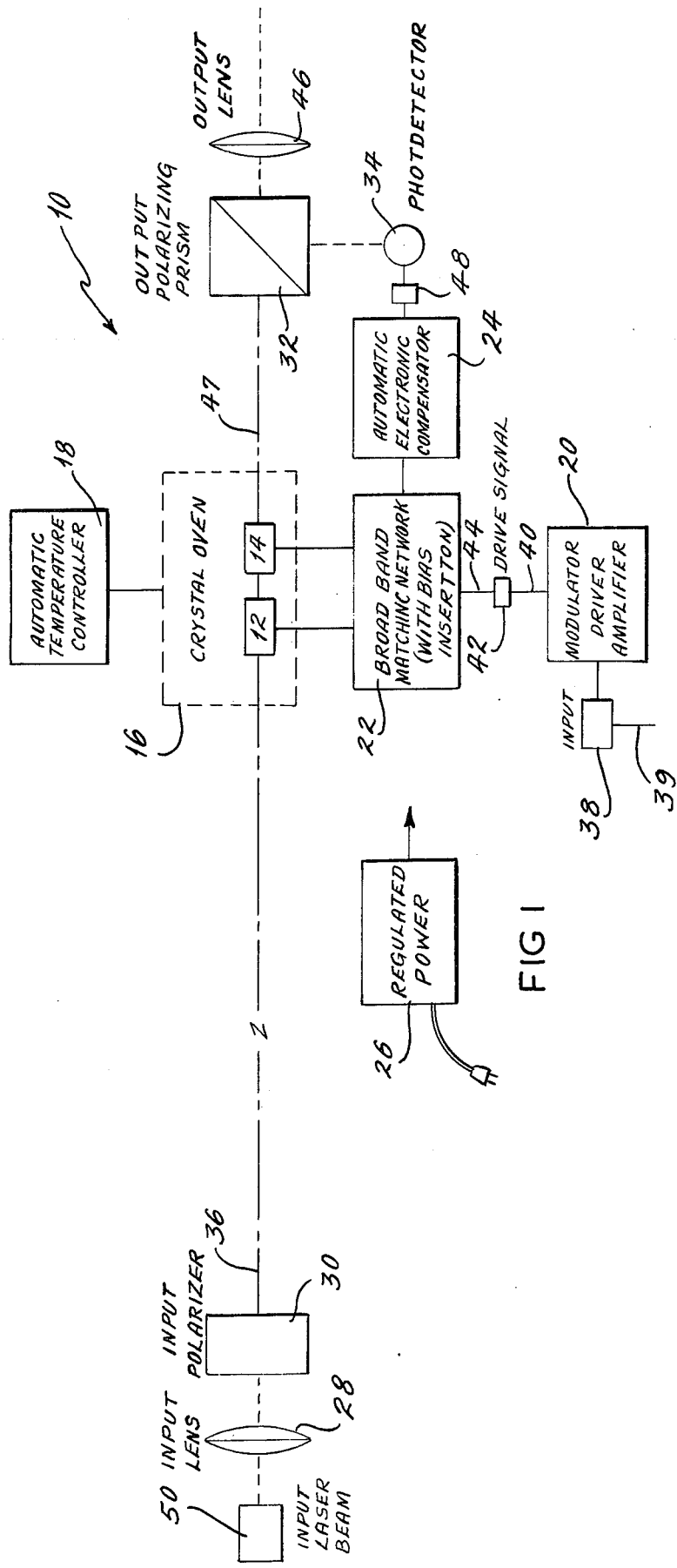
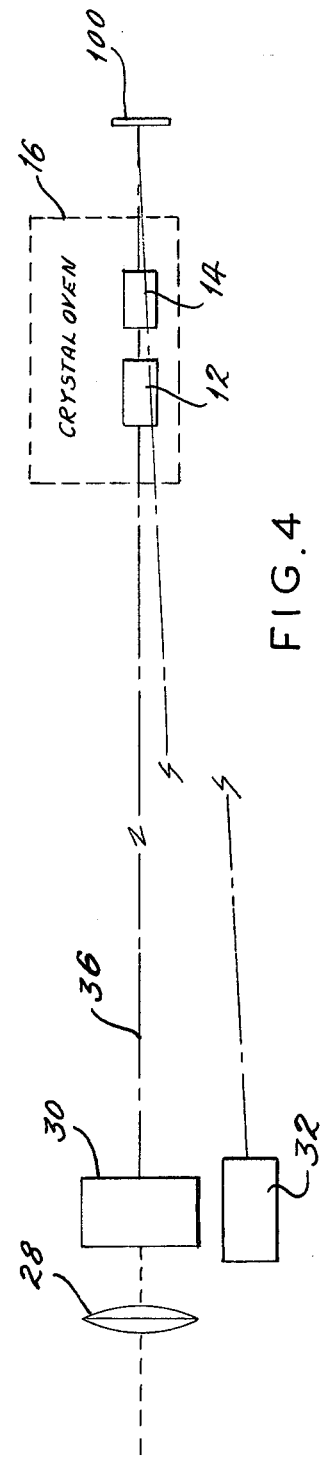

BROADBAND ELECTROOPTICAL MODULATOR

There are many electrooptical modulator devices of various types and constructions in existence, but so far as known, none is constructed to have as broadband characteristics as the present modulator, none uses relatively small solid state optical modulator and driver means, none is as relatively independent of temperature variations, and none has many of the structural and operational features and advantages which characterize the present device as will be explained. The need for an improved electrooptical modulator, especially in communications systems where baseband modulation of a mode-locked laser transmitter is employed, has been recognized. Furthermore, baseband modulation of narrow mode-locked laser pulses is recognized as the most efficient optical modulation means known to date from the standpoint of signal power. The subject modulator means and the concepts and operating characteristics thereof are of this type, and are also compatible for use with gated photodetectors and other devices, and as such, offer signal-to-noise and other advantages over known constructions, even when operating under relatively high background conditions. The subject modulator also has other advantages including being able to be used in the transmission and reception of digital and analog data, it can be operated on various modulation formats including on continuous wave (CW), CW mode-locked, CW analog, pulse coded modulation (PCM)-(CW digital), and on pulse gated binary modulation (PGBM)-(mode-locked digital). The subject modulator also includes means to minimize the effects of temperature drift and it can be operated at elevated crystal temperature where optical damage and its effects are minimized. Furthermore, the subject modulator means are the only known space qualifiable modulator means of its type capable of operating over an extremely broadband of frequencies ranging from d.c. upwards to hundreds of megabits per second and even higher. The subject modulator means also include a novel form of matching circuit means which contributes substantially to its broadband characteristics and which has impedance characteristics that minimize distortion over the full bandwidth.

It is therefore a principal object of the present invention to provide an improved broadband electrooptical modulator.

Another object is to provide an electrooptical modulator in which the principal components are relatively small and are preferably constructed of solid state components.

Another object is to provide improved electrooptical modulator means for use in optical communication and like systems.

Another object is to provide an optical modulator that can be used to modulate a carrier wave or a mode-locked laser beam with controllable codes for application with and quantitative testing of optical detectors employed therewith and it can be used for other purposes as well.

Another object is to provide a relatively low power requirement optical modulator which includes temperature control means, which modulator can be operated on power even from a non-continuous power source.

Another object is to provide an optical modulator capable, with the possible addition of optical filter and polarizer means, of modulating almost any optical source.

Another object is to provide electrooptical modulator means in which different crystal heads can be used to produce different operating frequencies and other conditions.

Another object is to provide a space qualifiable modulator capable of operating over an extremely wide band of data rates including data rates in hundreds of megabits per second and even in the gigabit range.

Another object is to improve the extinction ratio of electrooptic modulator devices and systems.

Another object is to provide a relatively efficient optical modulator means for use with optical transmission and like means.

Another object is to provide means to automatically compensate for the long term aging effects which may occur in an electrooptical modulator.

Another object is to provide electrooptical crystal controlled modulator means which are relatively less temperature sensitive than known crystal controlled devices.

Another object is to overcome the natural birefringent problems that are associated with electrooptical crystals by employing optically coupled crystals.

Another object is to make use of crystals optically coupled in series in an electrooptical device, said crystals being used either in single or double pass configurations.

Another object is to teach the construction and operation of an electrooptical modulator capable of being operated on a variety of inputs including from continuous wave and continuous wave mode-locked laser input sources.

Another object is to teach the construction and operation of a broadband electrooptical modulator that can operate in a variety of different modulating formats including a continuous wave analog format, a pulse coded modulation format, and a pulse gated binary modulation format.

Another object is to teach the construction and operation of a novel matching network which has uniform matching characteristics over a wide band of operating frequencies.

Another object is to minimize optical damage in crystal controlled devices by providing means which enable electrooptical crystals to be operated at relatively high temperatures.

Another object is to reduce the power required to control and stabilize the operating temperature environment of crystal elements.

These and other objects and advantages of the present invention will become apparent after considering the following detailed specification which in conjunction with the accompanying drawings discloses a preferred embodiment thereof, and wherein:

FIG. 1 is a block diagram of an electrooptical modulator constructed according to one form of the present invention;

Figure 3:
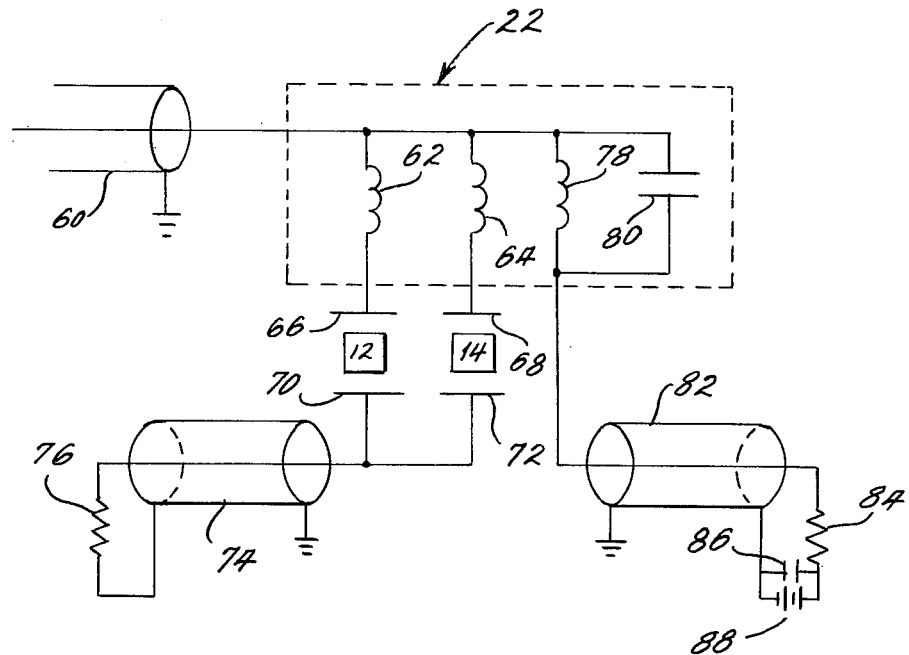
FIG. 3 is a schematic circuit diagram showing the details of the matching network employed in the modulator of FIG. 1; and, FIG. 4 is a modulator similar to that shown in FIG. 1 but modified to employ a double pass configuration.

Referring to the drawings more particularly by reference numbers, the number 10 indicates an electrooptical modulator incorporating the structural and operational features and principles of the subject invention. The modulator 10 includes electrooptic modulator crystals 12 and 14 which are located in a controlled environment or oven 16. The temperature in the oven 16 is controlled and maintained by automatic temperature control means 18. The modulator 10 also includes a suitably biased modulator driver amplifier 20, a broadband matching network 22, and automatic electronic compensator means 24. The operation of the electrooptical modulator crystals 12 and 14 are controlled by connection means from the modulator driver 20 operating through the broadband matching network 22, and also from the control inputs received from the automatic electronic compensator means 24 which are connected in the circuit in the manner indicated in the drawings. All of the means described above are included in the subject modulator 10 including the elements 12, 14, 16, 18, 20, 22 and 24, and for the most part these elements are electronic or include electronic means and are connected to a suitable power source such as a regulated source of bias power 26 which has input leads connected to a suitable external power source. Inasmuch as all of the electric elements included in the subject modulator are preferably constructed using solid state components, their size and power requirements are minimal which is advantageous.

The subject modulator can be used with different interchangeable optical heads including different coupled crystal assemblies 12 and 14, and the subject laser can be operated with different laser input sources such as with a mode-locked Neodymium yttrium aluminum garnet (Nd:YAG) laser radiating at some desired wavelength such, for example, as at either 1.06 or 0.53 micrometers and it can be operated with a continuous laser source. The output from the laser may also be a series of spaced plane polarized pulses. Other laser sources that can be used to provide the modulator input include HeNe, Argon or Krypton ion, and HeCd lasers to name a few. The selection of a particular input light source or laser is not at the heart of the invention. Optical heads and lasers of the type that can be employed in the subject modulator are known in the art. It is preferred, however, to employ a crystal assembly that contains at least one pair of crystals properly oriented to minimize objectionable birefringence. The assembly also has crystal mount means, oven or temperature control means, and associated optics including optical lens means 28 and input polarizer means 30 positioned as shown in FIG. 1. As indicated it is preferred to employ two similar crystals 12 and 14 located with their z-axes oriented to be perpendicular to each other to cancel the natural birefringence. This orientation and location of the crystals in the crystal pair also reduces or minimizes the temperature sensitivity of the extinction ratio and enables the crystals to be operated at higher temperatures than otherwise would be the case which is another advantage. Reducing the temperature sensitivity of the extinction ratio is an advantage because the extinction ratio is a measure of the ability of the crystals to be able to end or terminate (cutoff) a pulse quickly and at a precise instant. The higher the extinction ratio the higher will be the frequency or data rates that can be handled and the better will be the performance especially at the high data rates. Extinction ratios greater than about 20 to 1, which are generally considered to be relatively good ratios, can be obtained with the present construction even while maintaining a relatively good signal-to-noise ratio, another important operational characteristic. The crystals 12 and 14 used in the subject modulator 10 are usually elongated crystals having optically polished end surfaces and mounted to be in series optically with each other. With this arrangement either a single or a double pass configuration can be used. In a single pass construction the input passes once through each of the two crystals to the output, and in a double pass construction the input passes through the crystals in one direction, impinges on a reflector and is reflected back through the crystals a second time to the output which is spaced laterally at some small angle from the input. When a double pass configuration is used the required switching voltages are usually substantially reduced.

The temperature control means 18 are preferably employed using pulse width modulation to maintain the oven temperature in which the crystals are positioned as stable as possible, preferably to less than about 0.1° Centigrade variation. The advantage of using pulse width energy to power the temprature controller 18 substantially reduces the energy required as compared to input energy sources such as sources which include a continuous supply of heater energy. Pulse width modulation is accomplished by pulsing the temperature controller 18 on and off as required to maintain the required non-fluctuating oven temperature.

The long term aging effects on the subject modulator are compensated for in another way in the present device using the automatic electronic compensator 24. The compensator 24 for some purposes is designed and constructed to operate off the output laser energy from the cyrstals in such a way as to maximize the extinction ratio by providing a closed-loop dither-control. The automatic electronic compensator 24 receives its inputs from the modulated optical outputs of the modulator by way of an output polarizing prism or beam splitter polarizer 32. The polarizer 32 is a device that passes portions of the modulator output energy of one polarization and deflects or reflects another portion of the output to the compensator 24. The reflected energy in the present construction is first presented to a photodetector device 34 which operates to convert it from optical form to electric form for thereafter presenting to the matching network 22 and then to the control electrodes of the crystals 12 and 14. The beam splitter polarizer 32 has its plane of polarization oriented to be at 90° relative to the plane of the modulator outputs, and therefore is able to separate the modulator output pulses it receives from the modulator crystals 12 and 14 by separating the output pulses on the basis of their polarization. This is another way of saying the polarizer 32 is able to separate the binary 1's in the output from the binary 0's. The automatic electronic compensator 24 operates like an automatic gain control to feed back control signals to the modulator crystals 12 and 14 in such a manner as to compensate for variations or fluctuations that are sensed in the output thereof.

The modulator driver means 20 serves a different function than the compensator means 24 by providing switching voltages which, like the compensator, are applied to and through the broadband matching network 22 to opposite conductive surfaces or electrodes on the modulator crystals 12 and 14. These are the signals that control the intelligence that is applied to modulate the laser input beam 36. The inputs to the modulator driver 20 can be derived in many different ways such as from analog-to-digital converter circuit 38. The circuit 38, as shown, has several input and output connections in addition to a connection from the regulated bias power source 26. The analog-to-digital converter 38 is preferably constructed to employ simultaneous conversion techniques to quantize the sample video or other input signals it receives at its input 39 such as into five bit resolution or the like. The output of the driver circuit 20 is connected by lead 40 to one side of a gate or switch 42 (when used) and from there by another lead 44 to one of the inputs of the matching network 22. The switch 42 may have many different forms including being a gate such as an OR gate, and it may even be a mechanical switch. The switch is included to provide means to select between several different possible sources of inputs to the modulator such as between sources of modulator input signals used for different purposes including for test purposes. The inputs to the driver 20 may also be from analog and digital sources but must be in a digital or pulse form when applied by the driver to the matching network 22.

The modulator driver 20 is usually constructed to include a plurality of different level amplifier stages, the lower level stages preferably being operated as Class A amplifiers to minimize distortion, while the higher level stages may employ common emitter switching amplifiers (not shown) with broadband feedback stabilization networks and other related means. Amplifiers of these types are well known in the art and are not parts of the present invention as such. These and other structural and operational details of the driver 20 may be of known constructions as indicated, and it is not deemed necessary to go into the details of these circuits since the invention is not centered in the structure of the selected driver circuits.

The signals from the analog-to-digital converter 38 or other input source as stated are fed to and amplified by the modulator driver circuit 20, and are then fed to and through the broadband matching network means 22 for application to the control electrodes of the modulator crystals 12 and 14 to control the operation thereof on the input light beam 36 and hence to control the modulation that is applied to the beam 36 as it passes in one or both directions therethrough. The optical output of the modulator crystals 12 and 14 is a modulated optical output or beam 47 which has portions differently polarized according to the electric signals applied to the crystal electrodes.

The details of the broadband matching network 22 are important to the invention and one form of this network is disclosed in FIG. 3. The network 22 includes a plurality of passive electrical circuit components including inductors, capacitors and resistors and it also includes impedance matched transmission lines shown as coaxial cables connected as shown. The components of the matching network 22 are connected in the drawing as shown such that the electrooptic modulator crystals 12 and 14 become parts of the network, and in such a way that they see a relatively constant impedance at all frequencies when they look to the modulator driver 20 or any other input. The signals impressed upon the electrodes of the electrooptic modulator crystals 12 and 14 by way of the matching network may range in frequence from d.c. or steady state signals to signals having frequencies of many hundreds of megahertz and even signals in the gigahertz range. Furthermore, because of the broadband characteristics of the matching network 22 these signals enable the output of the subject modulator 10 to be able to faithfully reproduce the input modulation from the source over a wide frequency range of the input laser beam 36 in consonance with the signals impressed upon the crystals from the modulator driver 20 and from the analog-to-digital converter 38 or from any other input source including sources such as pseudorandom noise generators and other like devices.

The present system operates by applying the output of a laser such as the laser output 36 from a mode-locked Nd:YAG laser source 50 radiating at some known wavelength such as that mentioned above, namely, at 1.06 or 0.53 micrometers, as the input to the subject modulator. At the same time the modulator crystals 12 and 14 are controlled by the signals applied from the driver 20 to modulate the laser beam as it passes through the crystals of controlling its exiting polarization. In this way the subject modulator produces an output beam for transmission or other use which is made up of data bits, the polarity of each of which is controlled in such a way as to represent the intelligence desired to be transmitted. The transmitted beam can have many different modulation formats as indicated. At the same time a portion of the output is separated out by the polarizing beam splitter or prism 32 and is applied as a compensating feedback signal to control and maintain the modulator output relatively constant and independent of variations and fluctuations. Another portion of the modulated output passes directly through the prism 32 and through an output lens 46 and is transmitted to some remote location such as where a receiver is located to receive and demodulate or otherwise use the information. The receiver may include demodulator means similar to the crystal modulator means described above to demodulate the received signals for some purpose. In the system as disclosed, the video inputs applied to the analog-to-digital converter circuit 38 may be in analog or digital form, but if in analog form it should be converted to digital form before it is applied to the electrodes of the modulator crystals 12 and 14.

Various forms of crystals can be used for the crystals 12 and 14 in the subject device. Examples of crystal materials that can be used include lithium niobate, lithium tantalate, strontium barium niobate, barium sodium niobate, and potassium dihydrogen phosphate and its deuterated isomorphs. Lithium tantalate, however, seems to offer certain advantages over some of the others and crystals of this type when used in the subject device are usually operated in pairs with the crystals in each pair positioned and oriented to be in optical alignment with their Z-axes perpendicular to each other. Light propagating at right angles from the Z-axis in lithium tantalate cyrstal propagates as an ordinary "O" wave or as an extraordinary "E" wave without double refraction, sometimes referred to as beam walk-off. The "O" wave is polarized normal to the Z-axis and the "E" wave is polarized parallel to the Z-axis. The two waves have slightly different phase velocities or refractive indexes, which is governed by the equation $n = c/v$ where $n$ is a unitless quantity, $c$ is the velocity of light, and $v$ is the relative phase velocity between the two waves. The polarization axes of the crystals are sometimes also referred to as the fast and slow axes.

Electric fields applied along the Z-axes change the phase velocities of the "O" and "E" waves by different amounts, and this in turn changes the phase retardation (Γ) between the "O" and "E" waves. This effect is referred to in the literature as the "transverse electrooptic effect". This effect has importance for the successful operation of the present modulator.

If the input light beam 36 from the laser source is polarized at an angle of 45° relative to the Z-axes of the crystals, it will be resolved by the respective crystals into equal "O" and "E" components which travel at different velocities therethrough. The polarization state of the emerging light will then depend upon the net relative phase retardation between the two waves. For an even number of half waves of net relative phase retardation of the light beam traveling through the crystals there will be no change in the relative phase retardation but for an odd number of half waves, the emerging light will be linearly polarized at −45° relative to the Z-axes. The output polarizer or prism 32 oriented at −45° to the Z-axes will then transmit or block the emerging beam depending on whether the net retardation is due to an even or to an odd number of half waves. When voltages are applied to the electrodes associated with the crystals, the electrooptic effect will produce a change in the net retardation and hence control the polarization of the output.

The subject electrooptic modulator is able to operate in the linear analog and in the digital modes as stated. In the digital mode the net retardation, with no modulating voltage corresponding to a binary "0", is adjusted to an even number of half waves by the d.c. bias voltage generated by the automatic electronic compensator 24, and this is done so that no light is transmitted. However, when the driver amplifier 20 delivers an electric pulse corresponding to a binary 1, the retardation will be changed by one-half wave and the modulator will transmit while voltage is applied. Hence, the applied voltage can produce a start-stop or transmit-no-transmit condition because it has the effect of changing the net retardation from an even to an odd or from an odd to an even number of half waves. This mode of operation is particularly useful to transmit a binary coded modulation (PCM) format using a continuous wave (CW) laser source or a pulse gated modulation format (PGBM) using a mode-locked laser source. In the latter case, the individual mode-locked pulses are synchronized with the electric pulses from the modulated driver and the modulator output consists of transmitted pulses representing binary 1's and missing pulses representing binary 0's or vice versa.

When the subject modulator operates in the linear analog mode with a CW laser, the automatic electronic compensator 24 generates a bias voltage such that the passive component of the phase retardation equals $(2n + \frac{1}{2})\pi$ in the absense of a modulating signal. The light emerging from the crystal under these circumstances is righthand circularly polarized and only half of the light is transmitted. $n$ in the equation refers to an integer number of quarter wavelengths.

Unfortunately, the refractive indices of electrooptical crystals are temperature dependent and consequently the net retardation changes with change or drift in the ambient temperature. The performance of the subject modulator can be seriously degraded if the retardation (Γ) changes even slightly, and such changes occur even with relatively small temperature changes of the order of 0.1° Centigrade and even smaller. To reduce the temperature sensitivity of the passive retardation, a standard "cross-crystal" crystal configuration such as described above is greatly preferred over single crystal operation. This involves using two series coupled electrooptic crystals of equal physical length and of similar construction and operating characteristics but which are oriented so that light propagates normal to their Z-axes. However, the fast axis of the first crystal (O wave in lithium tantalate) is oriented parallel to the slow axis (E wave in lithium tantalate) in the second crystal. Therefore, the light that propagates as a fast wave in the first crystal propagates as a slow wave in the second crystal and vice versa, and because of this the net retardation cancels out to a first order approximation. This is an important advantage obtained by using a pair of crystals because not only is natural birefringence neutralized but ambient temperature drift also has far less effect upon the operation. The more precisely this undesirable effect can be cancelled the better will be the operation.

There are also advantages in maintaining the temperature at which the crystals operate relatively high as well as relatively constant. It is for this reason that the crystal oven 16 is used. The advantages obtained by operating the crystals at a higher temperature include:

1. the ability to be able to use relatively lower half wave switching voltages at the elevated crystal temperatures;
2. the effects of optical damage are greatly reduced in most crystals when operated at elevated temperatures; and
3. if the temperature of the crystals is maintained constant the undesirable retardation drift is reduced or eliminated. A preferred form for the crystal temperature control means 18 includes means which operate by supplying a minimum amount of electric power to the heater means in the oven 16, and this involves using means that produce repetitive rectangular pulses of varying duty factor. Such means also minimize temperature fluctuations. The temperature control means also include a thermister or other temperature sensitive device (not shown) which is positioned in the oven 16 to sense the oven temperature. The thermister is preferably connected into a bridge or bridge-like network (also not shown) which operates so that if the temperature rises or falls relative to the desired temperature, the controller will supply less or more power as required to maintain the temperature constant. This is done by varying the duty cycle or length of the power pulses that are provided. Other forms of temperature control means are also possible and can be used but it has been found to be highly desirable in systems of the type contemplated for the subject modulator to use temperature control means which operate by varying the duty cycle of the power pulses. This is because the amount of heater power required can be a serious limiting factor especially when the system is used in space vehicles and in other remote locations where the availabe power is limited. It has also been discovered that some crystals operate better at elevated temperatures than others, and some produce less optical damage than others when they are exposed to relatively intense visible radiations especially at lower operating temperatures such as at room temperature. These undesirable effects may be the result of photoionization of impurity sites or other defects in the crystal lattice which are manifested by the local refractive index inhomogeniety in the vicinity of the laser beam. This can seriously degrade the modulator performance if not compensated for. Such effects are greatly reduced at operating temperatures in excess of about 150° C probably as a result of faster thermal ionization of the entrapped holes and electrons. There are practical limitations, however, on the upper limits of the crystal operating temperature and this should be taken into account. Power requirements may also be a factor in selecting an oven temperature.

It is well known that electrooptic crystals are not made of ideal dielectric materials and that they absorb small amounts of applied RF power. The heat evolved in the crystals because of this absorption for best operation must be conducted outwardly into the crystal oven, and care must be taken in doing this because if the thermal path of the oven is different for the two crystals, a temperature gradient or difference may result which will change the value of the passive retardation and introduce optical degradation. The automatic compensator means 24 are designed to sense changes in the passive retardation and to produce changes in the d.c. bias voltage applied to the crystals for the purpose of maintaining a correct operating condition.

The circuits employed in the automatic electronic compensator 24 will be different for the digital and analog modes. In the digital case, the photodetector 34 produces an output which is fed through an electrical gating circuit 48 which passes the signal only when the modulator voltage is in an O condition which is the condition corresponding to a binary O. The light detected by the photodetector 34 should be zero or at a minimum when the bias is properly set. The signals transmitted by the gate 48 consist of the undesired leakage mounted by the dither. The dither component is detected by phase sensitive detector means which not only sense whether the retardation is greater or less than $2n$, but also sense the magnitude of the error. This error is used to correct the bias voltage in the feedback control loop. The gate 48 is required since the phase of the dither component of the photodetector output is reversed when the voltage is applied and the error signal derived is meaningless.

In an analog situation, the output of the photodetector 34 at the second harmonic of the dither frequency, the frequency of the compensating control voltage, vanishes and changes sign as the retardation $\Gamma$ passes through $(2n + \frac{1}{2})\pi$. The output error voltage is used to correct the bias on the crystals to restore the passive retardation $\Gamma_o$ to the condition of $(2n + \frac{1}{2})\pi$. In both cases, the dither is injected at a frequency below the lower cutoff frequency of the modulator bandwidth, and proper operation would not occur if the modulating voltage contained significant components of the dither frequency.

Electrooptic crystals with conducting electrodes on the faces normal to the Z-axes behave electrically like slightly lossy capacitors and hence operate as almost purely reactive loads. Broadband driver amplifiers, on the other hand, operate best when driving purely resistive loads. Moreover, a purely resistive load can be driven through a matched transmission line at any distance from the driver amplifier. As shown and described above in connection with FIG. 3, the crystals in the subject optical modulator system are impedance matched to standard transmission line impedances which may be 50 $\Omega$ impedances, the impedances being chosen to be this low partly from the viewpoint of increasing the modulator speed or bandwidth as compared to the selection of higher impedances. Furthermore, the lower the resistance of the matching network, the broader will be the bandwidth, but there are limitations in this regard mainly due to considerations as to the modulator speed. Therefore, the broadband matching network as disclosed in FIG. 3 has been found to be particularly desirable for the subject construction, and the values of the various components including the inductances in series with the crystals and the other elements are selected to achieve desired operating characteristics including a desired damping factor $\xi$ which can be expressed:

$$\frac{R_1}{2} \sqrt{\frac{C_1}{L_1}}$$

where $C_1$ is the capacitance of the crystal, and the values of the inductance, capacitance and resistance are all chosen such that the input driver impedance is equal to the matched impedance of the coaxial cables and can be expressed as $$\sqrt{\frac{L_2}{C_1}} \text{ or } \sqrt{\frac{L_1}{C_2}}$$

In such a matching network the impedance looking in at the input is the same at all frequencies. Applicants believe a matching network of this construction and having these characteristics is unique and that it is also unique to use such a network to impedance match a crystal modulator device such as disclosed to a transmission line to eliminate mismatch and reflection in a circuit that has three broadband characteristics. Also, the second order modification which is available by means of this network to adjust the pulse damping factor is novel and important to the invention.

Referring to FIG. 3 the matching network 22 is shown as including a source of crystal input fed thereto over driver input coaxial cable 60 constructed to have a matching driver impedance designated as $Z_o$. This input to the network is applied to the common side of two inductors 62 and 64 which are connected respectively in series with one of the control electrodes 66 and 68 of the crystals 12 and 14. The opposite crystal electrodes 70 and 72 are connected electrically to each other and to one end of the center conductor of an output coaxial cable 74. The cable 74, like the input driver cable 60, is constructed to have the same characteristic impedance as the cable 60. A typical characteristic impedance for good operation is 50 ohms of pure resistance. The inner and outer conductors of the output coaxial cable 74 at the other end are connected across a resistor 76 which has the same resistance as the characteristic cable impedance $Z_o$. The outer conductor of the coaxial cable 74 as well as of the other cables is also grounded.

The center conductor of the driver cable 60 is also connected to one side of a parallel circuit formed by a matching inductance 78 and a matching capacitor 80. The other side of this parallel matching circuit is connected to one end of the center conductor of another output coaxial cable 82 which is constructed to have the same matched impedance characteristic as the cables 60 and 74. The other end of the center conductor of the cable 82 is connected to one side of a resistor 84, which has the same resistance as the characteristic impedance of the cables, and the opposite side of the resistor 84 is connected to a circuit formed by another capacitor 86 in parallel with a d.c. source such as battery 88.

The particular form of the matching network 22 as shown in FIG. 3 is suitable for the subject construction because it has exceptionally good broadband characteristics and is therefore able to maintain relatively constant impedance characteristics at all or nearly all frequencies ranging from 0 or d.c. to the hundreds of megahertz range and even into the gigahertz range. While the matching network 22 is shown in association with the subject modulator device, it has application for use in other devices as well including application to other electronic and electrooptic devices with the same inherent advantages, principle of which is its ability to maintain constant impedance over an extremely broad range of frequencies.

The modulator driver 20 as well as other components used in the subject construction preferably are constructed using solid state devices and are designed to receive the logic output from a suitable source such as the emitter coupled logic output from a data generator, and by amplification and pulse shaping, to provide halfwave switching voltage wave forms which are applied to the modulator crystals. The driver amplifier circuits employed herein may be of known construction and are preferably constructed in several stages including using emitter coupled pairs which operate in a switching mode to isolate the driver from noise and from amplitude variations which may be present in the input signals. In the broadband analog mode, a broadband matched linear amplifier may also be used in place of the pulse amplifier described above.

Figure 2:
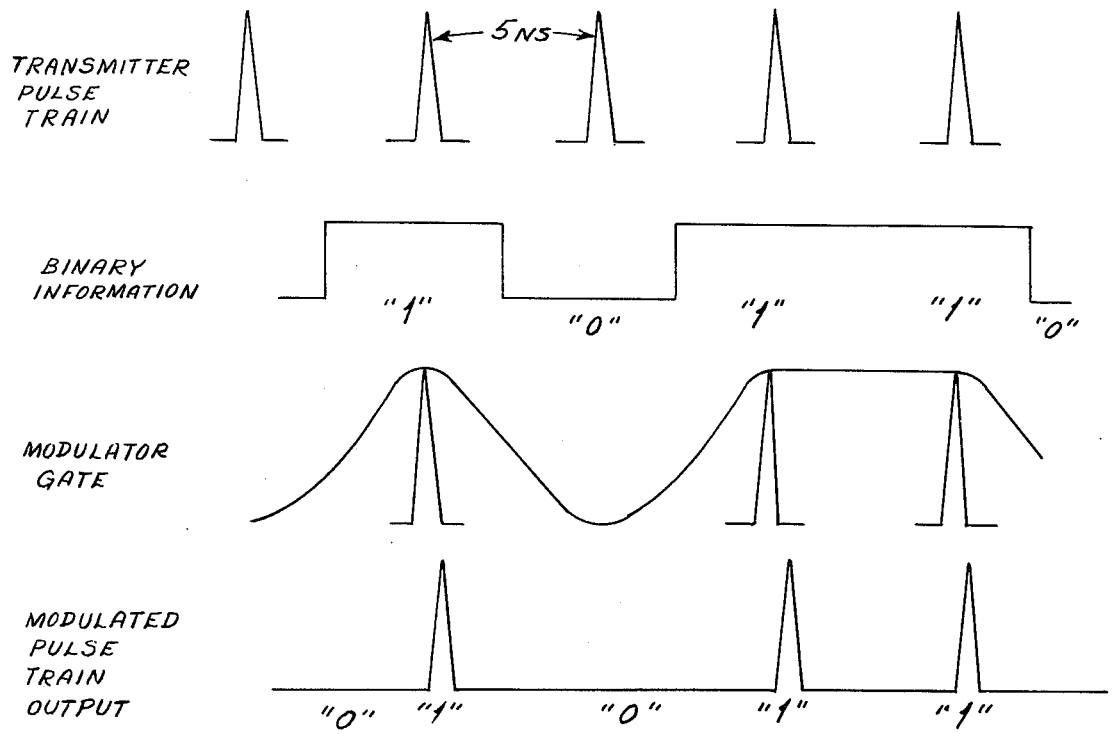
FIG. 2 is a series of graphs illustrating the time sequence or relationship of a particular set of input signals modulated by the modulator means of FIG. 1.

FIG. 2 shows the shape and position of the pulses which occur in a typical pulse gated binary modulated (PGBM) situation. The upper graph is a row of pulses that are the transmitter pulse train and is made up of equally spaced pulses shown as spaced at equal 5 nanosecond time intervals. The second graph shows binary information which is in the form of control voltages that are applied to the opposite electrodes of the crystals to modulate the pulse train as it passes through the crystals. The binary information is in the form of different voltage levels, one of which produces output pulses of one polarization, for example, to represent binary 1's and, the intervening voltage levels, or absence of voltage, produce output pulses of a different polarization to represent binary 0's. The third graph line in FIG. 2 is a graph which represents the modulator gating action which is used for control purposes. The fourth or bottom graph line is the modulated pulse train output which is represented as a series of spaced pulses with positions where pulses are absent. The position of the pulses in this graph are grouped to represent the modulation that is applied to the input pulse train shown in the upper graph. Note that there is shown a slight delay between the locations of the output pulses as compared to the corresponding input pulses. This delay is due to the effect of the gating means that are employed. Other modulating formats could also be similarly graphically represented.

FIG. 4 shows a double-pass configuration wherein the optical input or laser input energy first passes through the crystals 12 and 14 in one direction whereupon it impinges on a reflector device or mirror 100 and is redirected or reflected to pass back through the crystals in the opposite direction. The reflected optical energy thereupon impinges upon an output prism 32 which has been relocated from the position shown in FIG. 1 and is handled in the same way as aforesaid. The incident and reflected energy beams in the double-pass configuration are angularly related to each other at a very small angle which is determined by the orientation of the mirror 100, and the locations of the input and output optical elements must be such that they do not interfere or get into each others way. This may mean that they must be located at a relatively substantial distance from the modulator assembly 16 to be able to be physically accommodated without interference.

An advantage obtained by using the double-pass configuration over a single-pass configuration is that the effective length of crystal traversed by the optical signal is substantially increased, and since the magnitude of the control or switching voltages applied to the crystals is determined in part, by the length of crystal traversed, the switching voltages in the double-pass configuration can be substantially less than in the single pass configuration. This is because the effective crystal length traversed is in an inverse relation to the magnitude of the switching voltage. This is an important operational advantage.

The present device can also be constructed using more than one pair of multiple crystal sets with the crystal members in each set having their axes oriented as indicated above. It is important, however, that the crystals in each pair or set be matched in order to minimize the deleterious effect of birefringence due to temperature variations that occur in the modulator during operation. This effect is discussed elsewhere in the specification.

The subject modulator means have many possible applications and uses including being used anywhere where it is desired to modulate or demodulate optical energy for some purpose such as in optical transmitters and receivers used in air-to-ground, air-to-air, satellite-to-satellite, and satellite-to-ground communciation systems, in synchronous-to-synchronous, and synchronous-to-asynchronous systems, in computer systems which process information in analog, bit or digital form, in control devices of various types, in television, radio and radar applications and in many other applications and systems. It can also be used in systems where a transmitter and receiver are located close together as in control devices for machine tool operations and the like as well as in situations where the cooperating units are far apart from each other. The present means also have special applications where the confidentiality of information is an important consideration. Typical devices or systems in which the subject means can be used include interplanatary and other communication systems and control systems located within the atmosphere. As stated, the subject means can be operated on many different formats including CW, CW mode-locked, CW analog, PCM (CW digital), and PGBM (mode-locked digital), and changing from one type of laser modulation or format to another can be achieved by making relatively minor modifications in the electrical configuration and in the optical coding.

One of the problems of known means, especially known means for modulating laser energy is the inability of such means to achieve sharp cutoff of the pulses due to the crystals employed having relatively poor extinction ratio characteristics. This is a severe restriction on bandwidth particularly at the upper end of the bandwidth. Also the inability of known devices to provide automatic gain control to stabilize their outputs and to make them relatively free of variations such as variations in input light intensity is a limiting factor. The present modulation means overcome these and other limitations and shortcomings of the prior art even while permitting good operation at relatively high frequencies or data rates such as at frequencies or data rates in the hundreds or megahertz and in the megabit and gigabit ranges.

Thus there has been shown and described novel optical modulator means which can be used to modulate the outputs of almost any optical source including laser outputs and other optical outputs or signals, which optical modulator means fulfill all of the objects and advantages sought therefor. Many changes, variations, modifications and other uses and applications of the present means will, however, become apparent to those skilled in the art after considering this disclosure and the accompanying drawings. All such changes, variations, modifications and other uses and applications which do not depart from the intention and scope of the invention ar deemed to be covered by the invention which is limited only by the claims which follow.

What is claimed is:

1. An optical modulator system comprising electrooptic modulator means including a pair of crystal members each having mutually perpendicular x, y and z optical axes, means mounting said crystal members in optical alignment with their z-axes oriented to be perpendicular relative to each other and relative to the crystal alignment, means to establish a controlled relatively non-temperature varying environment surrounding said crystal members, means directing optical input signals from a signal source at said aligned crystal members normal to the z-axes thereof whereby the input signals pass through the crystal members and exit therefrom, and means for modulating the optical signals as they pass through the crystal members by predeterminately controlling the optical polarization of the exiting signals, said modulator means including a source of electrical modulation signals, and means for applying said modulation signals to the crystal members, said last named means including a matching circuit network having relatively broadband characteristics connected between the modulation signal source and the means for applying the modulation signals to the crystal members, the modulation signals are applied to the crystals having an effect on the polarization of the optical signals passing through the crystal members.

2. The optical modulator system defined in claim 1 wherein said source of modulation signals includes analog-to-digital signal converter means.

3. The optical modulator system defined in claim 1 including automatic gain control means including means responsive to optical outputs from the crystal members of selected polarization, means to convert said responses to electric signals, and means to apply said electric responses to the crystal members, said last named means including the said matching circuit network.

4. The optical modulator system of claim 3 including gate circuit means connected between the response converting means and the matching circuit network.

5. The optical modulator system defined in claim 1 including means for amplifying the signals from the modulation signal source, said amplifying means includes series connected amplifier stages some of which are operated as class A amplifiers and some of which employ common emitter switching amplifiers and associated broadband feedback stabilization networks.

6. The optical modulator system defined in claim 1 wherein the optical input signals are coherent energy signals.

7. The optical modulator system defined in claim 2 wherein the analog-to-digital signal converter means include means to simultaneously quantize sample input signals.

8. Optical modulator means comprising a piezoelectric crystal assembly including a pair of optically aligned crystals having an optical input and an optical output, each of said crystals having mutually perpendicular x, y and z optical axes, means mounting said crystals with their z axes oriented to be perpendicular relative to each other and relative to the crystal alignment, means directing a beam of coherent radiation energy against the optical input whereby said energy beam passes through the aligned crystals and exits from the optical output, electronic means associated with the crystals to optically modulate the energy exiting therefrom including a pair of opposed electrodes attached to opposite sides of the crystals, and modulator driver means including a source of electric input modulating signals and means for applying said modulating signals to the opposed electrodes and to the crystals therebetween, said electric modulating signals controlling the optical polarization of the exiting coherent radiation energy.

9. The optical modulator means defined in claim 8 wherein said modulator driver means include a source of analog input video energy and analog-to-digital converter means to convert the analog input energy to digital form before applying it to the opposed electrodes.

10. The optical modulator means defined in claim 8 including means to stabilize the magnitude of the exiting coherent energy to compensate for variations sensed therein, said last named means including optical means positioned in the path of the exiting energy to separate the exiting energy on the basis of optical polarization, means positioned to respond to the exiting energy of a selected polarization only including means to convert the responses produced thereby from optical to electrical form, and means for applying said electrical responses to the opposed electrodes in the crystal assembly.

11. The optical modulator means of claim 10 wherein said means to separate the exiting coherent energy on the basis of polarization include a beam splitter oriented to pass exiting coherent energy to one polarization therethrough and to deflect exiting coherent energy of a different polarization.

12. The optical modulator means defined in claim 8 including means to maintain a predetermined temperature environment surrounding the crystal assembly, said means including means forming a chamber in which the crystal assembly is positioned, and means including temperature sensitive means and heat producing means positioned in the chamber.

13. The optical modulator means defined in claim 12 wherein the heat producing means includes a heater element positioned in the chamber, a source of relatively low non-continuous electric energy and means connecting said heater element to said source.

14. Means for modulating a coherent beam of pulse energy comprising a source of coherent energy, a crystal assembly having matched and optically aligned crystals with at least one corresponding optical axis of each crystal being oriented perpendicular to each other, means for directing coherent energy from said source at said aligned crystals whereby the energy passes therethrough and exits therefrom, electronic means associated with the crystal assembly and energizable to establish an electric field in the crystals to modulate the coherent beam as it passes through the aligned crystals by controlling the optical polarization of the exiting beam pulses, said electronic means including a source of electric modulation energy, means for amplifying and applying said modulation energy to the crystals, and means to maintain a predetermined relatively non-varying temperature environment surrounding the crystal assembly.

15. The modulating means defined in claim 14 wherein the source of modulation energy includes an analog signal source, and means for converting the signals from said analog signal source to digital form.

16. The modulating means defined in claim 14 wherein the source of modulation energy includes a matching network having relatively broadband characteristics, and means connecting said broadband matching network in circuit between the source of modulation energy and the crystal assembly.

17. The modulating means defined in claim 16 including a beam splitting polarizer element positioned in the path of the coherent energy exiting from the crystal assembly, said beam splitter element including an optical polarizer having its polarization axis oriented to pass portions of the exiting energy of one optical polarization and to reflect portions of the exiting energy of a different optical polarization.

18. The modulating means of claim 17 including means to convert the reflected portions of the exiting energy from optical to electric form and means for applying said electric responses to the crystals to stabilize the exiting energy by compensating for changes sensed in the magnitude thereof.

19. An electrooptical system for modulating a pulse beam of coherent energy comprising a source of pulsed coherent energy, an electrooptical crystal assembly having an optical input and an optical output, said crystal assembly including a pair of optically aligned crystal members having mutually perpendicular x, y and z optical axes, means mounting the crystal members in optical alignment with their z axes to be perpendicular relative to each other and relative to the crystal alignment, and means for connecting said crystal assembly to a source of electric modulating energy, means directing the pulse beam of coherent energy at the input of the crystal assembly whereby the beam passes through the crystal assembly and exits from the optical output thereof, means including modulator driver means operatively connected to the means on the crystal assembly for connecting to a source of electric modulating energy to modulate the coherent pulsed beam as it passes therethrough by controlling the optical polarization of the exiting optical pulses, and beam splitter means positioned in the path of the exiting modulated output of the crystal assembly, said beam splitter having a polarization axis oriented to permit passage therethrough of exiting beam energy of predetermined optical polarization only, said beam splitter being constructed to deflect portions of the modulated output beam energy of a different optical polarization.

20. The electrooptical modulator system defined in claim 19 including means positioned to convert selected portions of the modulated output beam energy from optical to electric signals which signals vary with changes in the magnitude of the output energy, and means for applying said electric signals to the crystal assembly to compensate for changes sensed in the magnitude of the said output and in a direction to maintain the output of the crystal assembly relatively constant.

21. Optical modulator means comprising a crystal assembly including a pair of matched crystals having mutually perpendicular x, y and z optical axes, means mounting said crystals in optical alignment with their respective z-axes oriented at right angles, a source of input optical energy including means for directing said input energy at the crystal assembly at one end of one of the aligned crystals whereby the energy passes through the aligned crystals and exits from the opposite end of the other crystal, means including a pair of opposed electrodes mounted on opposite sides of each of the aligned crystals, means connected to said electrodes for applying electric signals thereto to modulate the optical energy exiting from the crystal assembly by predeterminately controlling the optical polarization thereof, said last named means including a source of digital modulation signals and means including a matching network for applying said signals to the crystal electrodes, means positioned in the path of the exiting optically modulated energy for reflecting the exiting energy back through the aligned crystals at an angle relative to the exiting energy, and means located on the same side of the crystal assembly as the input optical energy for separating the reflected energy after it has passed back through the assembly according to its optical polarization.

22. The optical modulator means defined in claim 21 including means responsive to the separated output energy of one optical polarization for producing corresponding electric responses, and means for applying said electric responses to the crystal electrodes to stabilize the magnitude of the output and compensate for variations sensed therein.

* * * * *